United States Patent
Priddis et al.

(10) Patent No.: US 10,317,892 B2
(45) Date of Patent: Jun. 11, 2019

(54) SYSTEM AND METHOD FOR CONCURRENT MULTI-USER COMPUTER-AIDED MANUFACTURING

(71) Applicant: Brigham Young University, Provo, UT (US)

(72) Inventors: Andrew Priddis, Provo, UT (US); W. Edward Red, Provo, UT (US)

(73) Assignee: Brigham Young University, Provo, UT (US)

( * ) Notice: Subject to any disclaimer, the term of this patent is extended or adjusted under 35 U.S.C. 154(b) by 646 days.

(21) Appl. No.: 14/884,625

(22) Filed: Oct. 15, 2015

(65) Prior Publication Data

US 2016/0109878 A1 Apr. 21, 2016

Related U.S. Application Data

(60) Provisional application No. 62/064,463, filed on Oct. 15, 2014.

(51) Int. Cl.
G05B 19/418 (2006.01)

(52) U.S. Cl.
CPC ........... *G05B 19/4188* (2013.01); *G05B 2219/32099* (2013.01); *Y02P 90/18* (2015.11); *Y02P 90/24* (2015.11)

(58) Field of Classification Search
CPC .................................................. G05B 19/4188
USPC ...................................................... 700/95–129
See application file for complete search history.

(56) References Cited

U.S. PATENT DOCUMENTS

| | | | | |
|---|---|---|---|---|
| 5,006,990 | A * | 4/1991 | Ward | G05B 19/4097 700/97 |
| 5,452,456 | A * | 9/1995 | Mourey | G06F 9/4484 713/100 |
| 8,170,946 | B2 * | 5/2012 | Blair | G06F 17/227 700/106 |
| 2004/0006403 | A1 * | 1/2004 | Bognanno | G06Q 10/06 700/109 |
| 2005/0010325 | A1 * | 1/2005 | Dai | G05B 19/4093 700/179 |
| 2005/0149206 | A1 * | 7/2005 | Krane | G06F 9/451 700/17 |
| 2012/0110595 | A1 * | 5/2012 | Reitman | G06F 17/50 719/313 |
| 2014/0222919 | A1 * | 8/2014 | Nysetvold | H04L 65/403 709/204 |

(Continued)

OTHER PUBLICATIONS

Pal, Joyojeet, et al. "The case for multi-user design for computer aided learning in developing regions." Proceedings of the 15th international conference on World Wide Web. ACM, 2006.pp. 781-789.*

(Continued)

*Primary Examiner* — Satish Rampuria
(74) *Attorney, Agent, or Firm* — Kunzler Bean & Adamson (57) ABSTRACT

A computer-implemented method for concurrent multi-user computer-aided manufacturing may include (1) receiving a tool path descriptor resulting from a tool path request on a local copy of a part model, (2) submitting the tool path descriptor to a server for application to a shared copy of the part model, (3) receiving, from the server, shared model data corresponding to the tool path descriptor, and (4) applying the shared model data to the local part model. Various other methods and systems are also disclosed.

7 Claims, 5 Drawing Sheets

(56) References Cited

U.S. PATENT DOCUMENTS

| | | | |
|---|---|---|---|
| 2015/0213157 A1* | 7/2015 | Hepworth | G06F 17/50 703/1 |
| 2016/0098494 A1* | 4/2016 | Webster | G06F 17/50 703/1 |

OTHER PUBLICATIONS

Red, Edward, et al. "Multi-user architectures for computer-aided engineering collaboration." Concurrent Enterprising (ICE), 2011 17th International Conference on. IEEE, 2011.pp. 1-10.*

Jezernik, Anton, and Gorazd Hren. "A solution to integrate computer-aided design (CAD) and virtual reality (VR) databases in design and manufacturing processes." The International Journal of Advanced Manufacturing Technology 22.11-12 (2003): pp. 768-774.*

* cited by examiner

SYSTEM AND METHOD FOR CONCURRENT MULTI-USER COMPUTER-AIDED MANUFACTURING

CROSS-REFERENCE TO RELATED APPLICATIONS

This application claims the benefit of U.S. provisional application 62/064,463 entitled "Multi-User Computer Aided Manufacturing Application" and filed on 15 Oct. 2014. The foregoing application is incorporated herein by reference.

BACKGROUND

The subject matter disclosed herein relates to computer-aided manufacturing, and apparatus, systems, means, and methods for concurrent multi-user computer-aided manufacturing in particular.

Computer-assisted manufacturing (CAM) systems have forced users into a strictly serial process that has limited the efficiency of the tool path planning systems. The CAM system user typically selects the machining environment, then analyzes and creates supporting geometries by defining the stock material size and shape, setting the machine coordinate system, specifying the machine to be used, and identifying the work piece. What follows is typically an iterative process in which the user defines a manufacturing operation by selecting an appropriate cutting pattern, tool, depth per cut, cut area, etc. The user may start with a roughing operation, then analyze the remaining material, choose the next operation (e.g., semi-roughing, finishing, or adding features such as slots, holes, or chamfers) and repeat until all the excess material has been addressed and the part manufacturing process has been fully defined.

Besides the efficiency constraints created by the iterative nature of CAM process planning, additional limitations may arise due to a CAM system user's lack of knowledge or experience with a particular machine involved in the manufacturing process. The user may have to put process planning on hold while seeking additional information or assistance from a more experienced user.

Given the foregoing, what is needed is additional and improved systems and methods for concurrent multi-user computer-aided manufacturing, in particular, systems and methods that facilitate multiple simultaneous users. The embodiments disclosed herein were developed in response to these issues.

SUMMARY OF THE INVENTION

As will be described in greater detail below, the subject matter disclosed herein describes various systems and methods for providing concurrent multi-user computer-aided manufacturing. In one example, a computer-implemented method for concurrent multi-user computer-aided manufacturing may include (1) receiving a tool path descriptor resulting from a tool path request on a local copy of a part model, (2) submitting the tool path descriptor to a server for application to a shared copy of the part model, (3) receiving, from the server, shared model data corresponding to the tool path descriptor, and (4) applying the shared model data to the local part model. In some examples, receiving the tool path descriptor resulting from the tool path request on the local part model may include (1) performing the tool path request on the local part model and (2) extracting, from the local part model, data resulting from performing the tool path request to produce the tool path descriptor.

In one embodiment, the shared model data differs from the tool path descriptor and applying the shared model data to the local part model includes (1) reversing the tool path request on the local part model and (2) inserting the shared model data into the local part model. In some examples, reversing the tool path request on the local part model may include saving at least a portion of the local part model before performing the tool path request on the local part model and restoring the saved portion of the local part model to the local part model before inserting the shared model data into the local part model. In some examples, the computer-implemented method may further include indicating that the tool path request has not been committed to the local part model until the shared model data has been received from the server, and reversing the tool path request on the local part model may include deleting the uncommitted tool path request from the local part model.

In one embodiment, the shared model data is identical to the tool path descriptor and applying the shared model data to the local part model includes permitting the tool path descriptor to remain in the local part model without reversing the tool path request or inserting the shared model data into the local part model. In one embodiment, receiving, from the server, shared model data corresponding to the tool path descriptor where the shared model data is identical to the tool path descriptor may include receiving an indication from the server that the shared model data is identical to the tool path descriptor.

In one embodiment, a system for implementing the above-described method may include several modules stored in memory, such as (1) a tool path module that receives a tool path descriptor resulting from a tool path request on a local copy of a part model, (2) a communication module that (a) submits the tool path descriptor to a server for application to a shared copy of the part model and (b) receives, from the server, shared model data corresponding to the tool path descriptor, and (3) an application module that applies the shared model data to the local part model. The system may also include least one physical processor configured to execute the tool path module, the communication module, and the application module.

In one example, a computer-implemented method for concurrent multi-user computer-aided manufacturing may include (1) receiving, from a client, a tool path descriptor resulting from a tool path request on a local part model for application to a shared part model, (2) queuing, in a tool path descriptor queue, the tool path descriptor, (3) retrieving from the tool path descriptor queue, the tool path descriptor, (4) applying the tool path descriptor to the shared part model, and (5) submitting the applied tool path descriptor to the client for application to the local part model.

In some examples, the computer-implemented method may further include submitting the applied tool path descriptor to one or more additional clients for application to an additional local part model maintained by the additional client. In one embodiment, applying the tool path descriptor to the shared part model includes determining that the tool path request indicated by the tool path descriptor cannot be performed on the shared part model and submitting the applied tool path descriptor to the client includes indicating that the tool path request indicated by the tool path descriptor cannot be performed on the shared part model.

In one embodiment, a system for implementing the above-described method may include several modules stored in memory, such as (1) a server communication module that receives, from a client, a tool path descriptor resulting from a tool path request on a local part model for application to a shared part model, (2) a queue management module that (a) queues, in a tool path descriptor queue, the tool path descriptor and (b) retrieves from the tool path descriptor queue, the tool path descriptor, and (3) a server application module that applies the tool path descriptor to the shared part model. The server communication module may also submit the applied tool path descriptor to the client for application to the local part model. The system may also include at least one physical processor configured to execute the server communication module, the queue management module, and the server application module.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Some of the functional units described in this specification have been labeled as modules, in order to more particularly emphasize their implementation independence. Others are assumed to be modules. For example, a module or similar unit of functionality may be implemented as a hardware circuit comprising custom VLSI circuits or gate arrays, off-the-shelf semiconductors such as logic chips, transistors, or other discrete components. A module may also be implemented with programmable hardware devices such as field programmable gate arrays, programmable array logic, programmable logic devices or the like.

A module or a set of modules may also be implemented (in whole or in part) as a processor configured with software to perform the specified functionality. An identified module may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, enable the module to achieve the intended purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any tangible form capable of enabling execution of a program of machine-readable instructions on a digital processing apparatus. For example, a computer readable medium may be embodied by a flash drive, compact disk, digital-video disk, a magnetic tape, a magnetic disk, a punch card, flash memory, integrated circuits, or other digital processing apparatus memory device. A digital processing apparatus such as a computer may store program codes, associated data, and the like on the computer readable medium that when retrieved enable the digital processing apparatus to execute the functionality specified by the modules.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present disclosure is generally directed to systems and methods for concurrent multi-user computer-aided manufacturing. As will be explained in greater detail below, systems and methods described herein may facilitate concurrent multi-user computer-aided manufacturing by using a hybrid client-server architecture that allows users to use familiar CAM tools, with the server reconciling changes made by users on separate clients with a shared part model maintained by the server. Concurrent multi-user CAM may permit faster construction of a shared part model than is possible with single-user systems.

Figure 1:
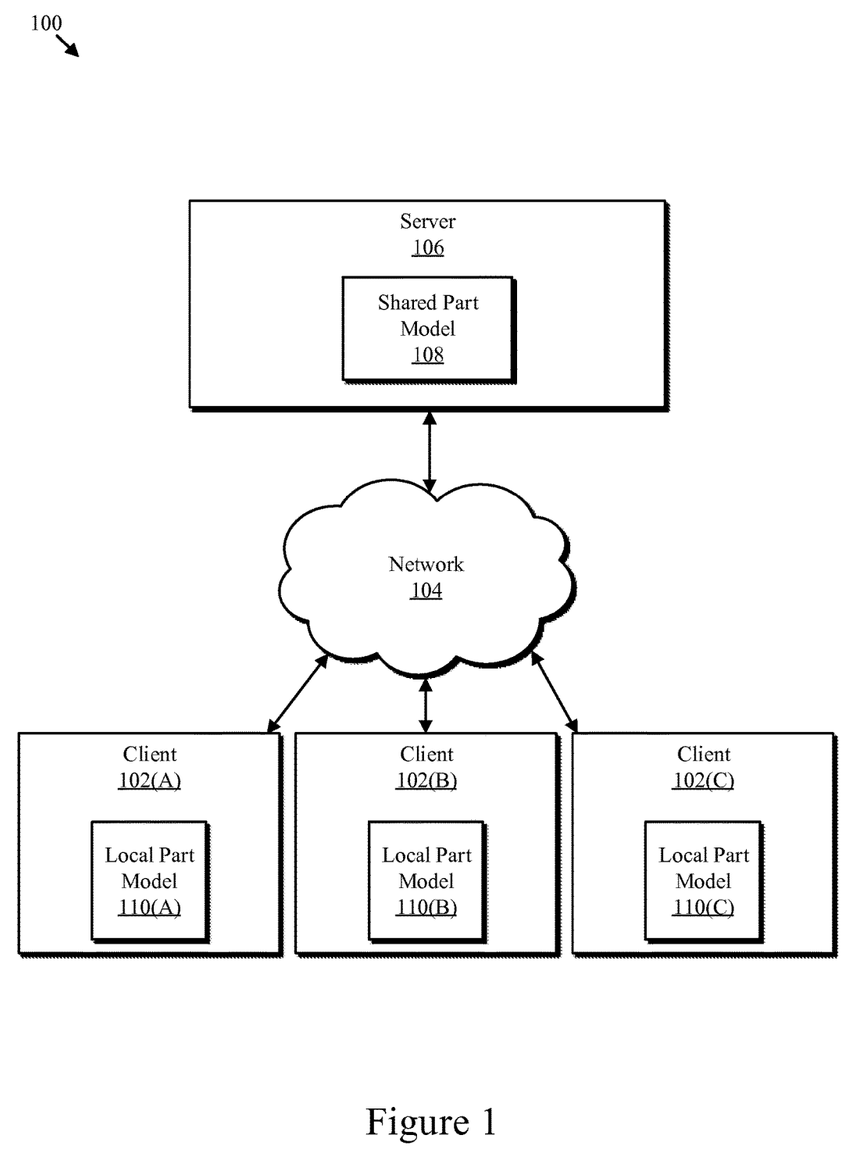
FIG. 1 is a schematic drawing of a system wherein a concurrent multi-user computer-aided manufacturing system may be deployed, in accordance with at least one embodiment of the present invention.
Figure 2:
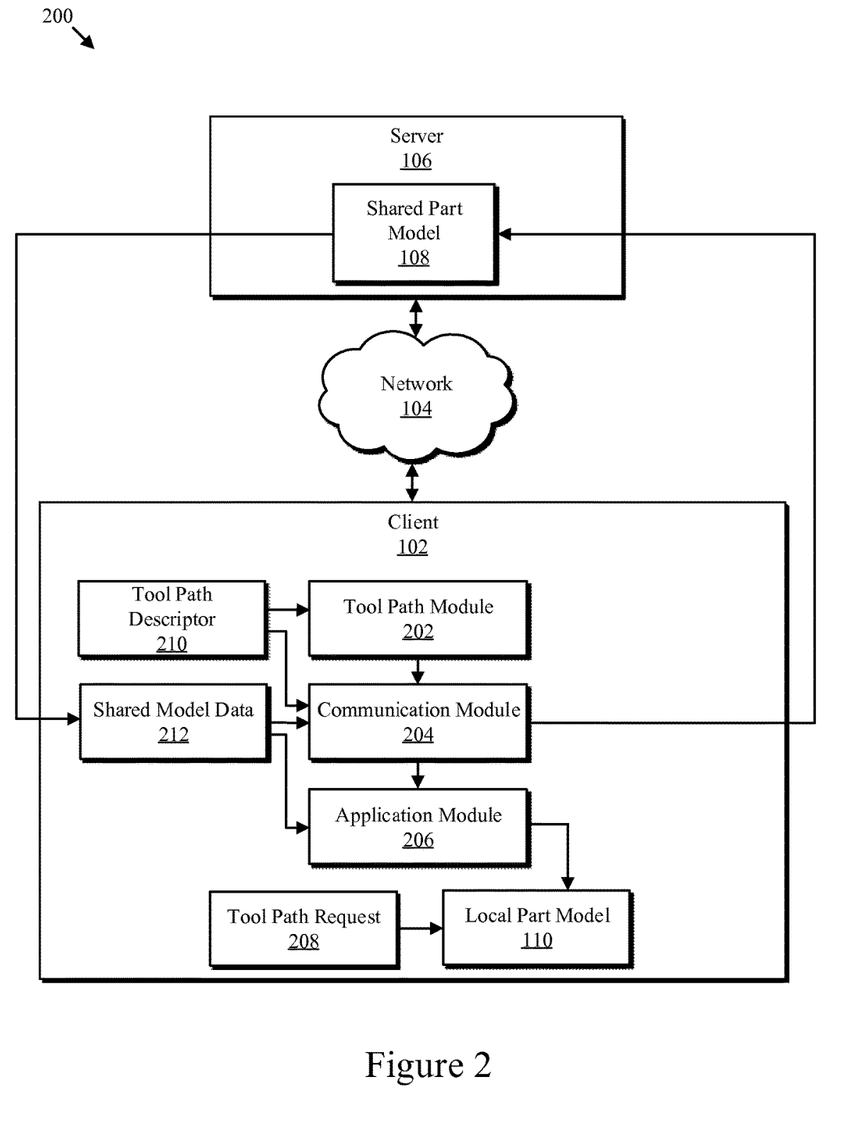
FIG. 2 is a functional block diagram depicting one embodiment of the system for concurrent multi-user computer-aided manufacturing.
Figure 3:
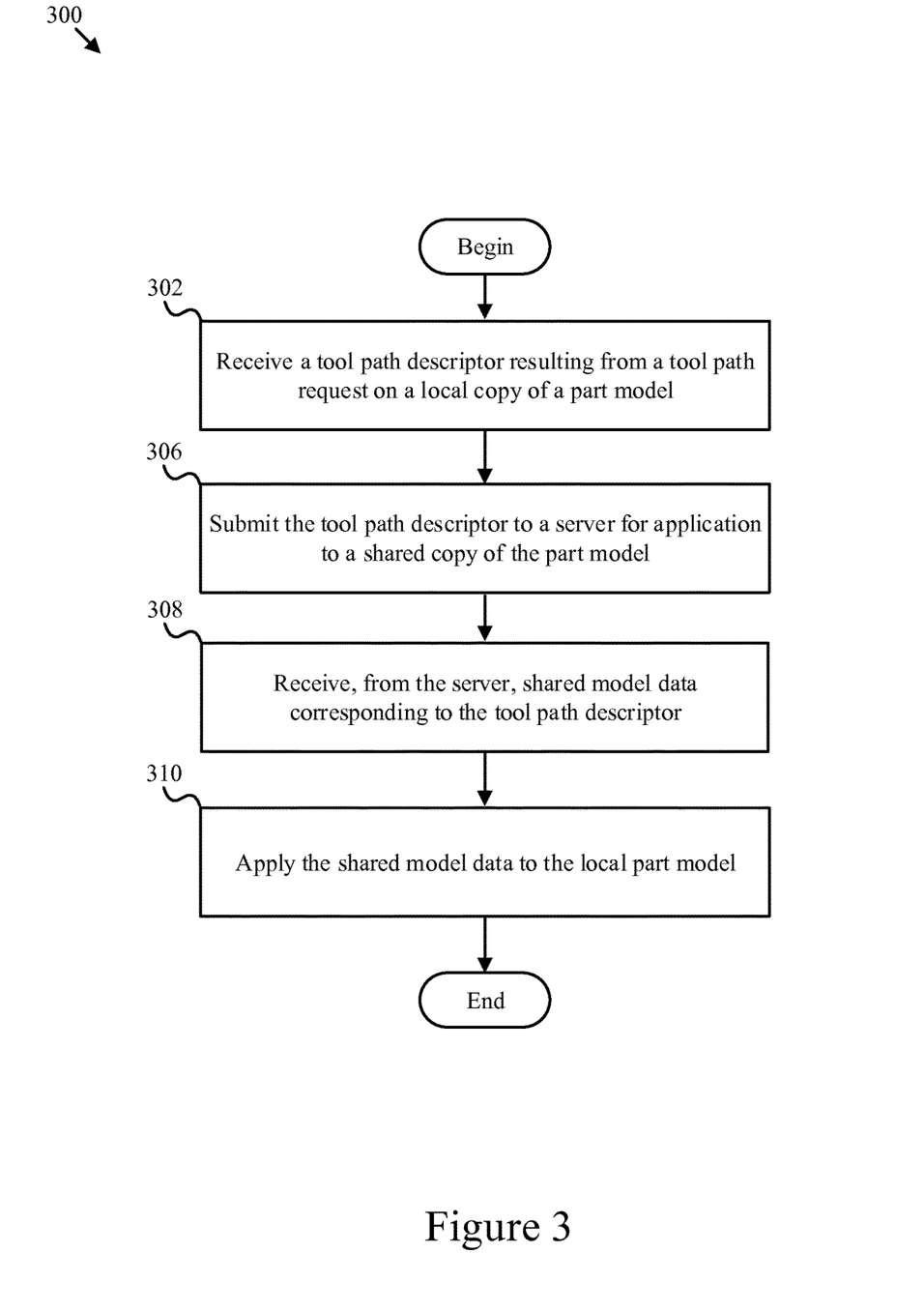
FIG. 3 is a flowchart diagram depicting one embodiment of a method for providing concurrent multi-user computer-aided manufacturing.
Figure 4:
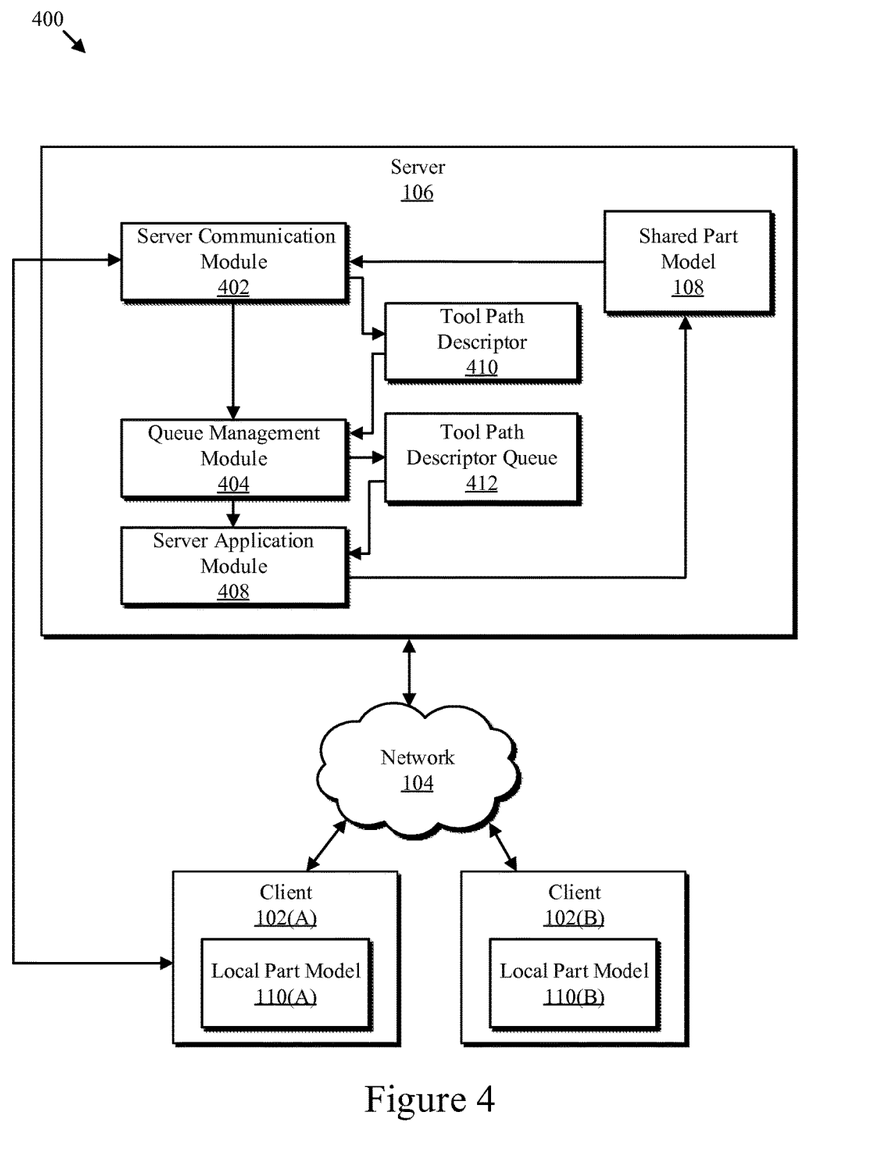
FIG. 4 is a functional block diagram depicting one embodiment of the system for concurrent multi-user computer-aided manufacturing.

The following will provide, with reference to FIGS. 1, 2, and 4, detailed descriptions of example systems for concurrent multi-user computer-aided manufacturing. Detailed descriptions of corresponding computer-implemented methods will also be provided in connection with FIGS. 3 and 5.

FIG. 1 is a schematic drawing of a system 100 wherein a multi-user analysis system may be deployed. As illustrated in this figure, system 100 may include one or more clients 102, a network 104, and a server 106. Server 106 may host a shared (i.e., global) part model 108. Clients 102 may host local model copies 110 that include at least of portion of shared part model 108.

Clients 102 generally represent any type or form of computing device capable of reading computer-executable instructions. Examples of clients 102 include, without limitation, laptops, tablets, desktops, servers, combinations of one or more of the same, or any other suitable computing device.

Server 106 generally represents any type or form of computing device or combinations of computing devices that is capable of storing, comparing, and/or providing data, as well as providing back-end processing services. Server 106 may represent a commercial or publicly-accessible service or a service provided to a single organization. Examples of server 106 include, without limitation, high-performance clusters, virtual machines, application servers, web servers, and/or database servers configured to provide various database services and/or run software applications, or combinations of one or more of the same.

In certain embodiments, server 106 may represent combinations of software applications and physical computing systems configured to perform various tasks. For example, server 106 may include a database server that manages one or more databases, such as shared part model 108. In one example, shared part model 108 may be configured to store geometry, design, analysis, material, and/or environment data representing one or more part models. Shared part model 108 may represent portions of a single database or computing device or a plurality of databases or computing devices capable of being accessed by computing devices included in server 106 and/or clients 102.

Network 104 generally represents any medium or architecture capable of facilitating communication or data transfer. Examples of network 104 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. Network 104 may facilitate communication or data transfer using wireless or wired connections. In one embodiment, network 104 may facilitate communication between clients 102 and server 106.

FIG. 2 is a functional block diagram depicting one embodiment of a system 200 for providing concurrent multi-user computer-aided manufacturing. As illustrated in this figure, system 200 may include one or more modules for performing one or more tasks. For example, and as will be explained in greater detail below, exemplary system 200 may include a tool path module 202 that receives a tool path descriptor 210 resulting from a tool path request 208 on a local copy of a part model 110. Exemplary system 100 may additionally include a communication module 204 that submits tool path descriptor 210 to a server 106 for application to a shared copy of the part model 108. Communication module 204 may also receive, from server 106, shared model data 212 corresponding to tool path descriptor 210. Exemplary system 200 may additionally include an application module 206 that applies shared model data 212 to local part model 110. Although illustrated as separate elements, one or more of the modules in FIG. 2 may represent portions of a single module or application.

FIG. 3 is a flow diagram of an example computer-implemented method 300 for providing concurrent multi-user computer-aided manufacturing. The steps shown in FIG. 3 may be performed by any suitable computer-executable code and/or computing system. In some embodiments, the steps shown in FIG. 3 (as well as FIG. 5) may be performed by the server 106, one or more clients 102, or partitioned across the server 106 and one or more clients 102.

As illustrated in FIG. 3, at step 302, one or more of the systems described herein may receive a tool path descriptor resulting from a tool path request on a local copy of a part model. For example, tool path module 202 may, as part of client 102 in FIG. 2, receive tool path descriptor 210 resulting from tool path request 208 on a local copy of a part model 110.

The term "tool path," as used herein, generally refers to one or more instructions for a machine tool, to be applied when cutting or shaping material to manufacture a part. Tool paths may include, without limitation, parameters such as cut patterns, cut depth, cut area, cut angle, spindle speed, number of passes, or feed rate to be used in controlling machine tools such as a drill press, mill, lathe, grinding machine, planer, shaper, etc.

Tool path module 202 may receive a tool path descriptor in a variety of ways. For example, tool path module 202 may be a plug-in or extension to a CAM system that monitors user actions on client 102 to detect user actions that change local part model 110. Changes may include creation, edit, or deletion of an operation, tool geometry, method, or program. When the user commits a change to local part model 110, tool path module 202 may extract data relevant to the change, such as an object type, the part to which the object belongs, a creator ID, and any other parameters that define the change sufficiently that the change may be replicated on another client. In one example, tool path module 202 may identify a sequence of commands that may be executed by a CAM system to replicate the change. In another example, tool path module 202 may compare changes to local part data before and after the user performs a function or executes a command that modifies the local part model. Tool path module 202 may then use the extracted data to produce a tool path descriptor that may be used to effect the detected change to another copy of the part model.

At step 304, one or more of the systems described herein may submit the tool path descriptor to a server for application to a shared copy of the part model. For example, communication module 204 may, as part of client 102 in FIG. 2, submit tool path descriptor 210 to server 106 for application to a shared copy of the part model 108.

Communication module 204 may submit the tool path descriptor to the server in any suitable manner. For example, communication module 204 may maintain a network connection to the server to facilitate two-way communication between the client and server. Communication module 204 may construct a message in a protocol known to an application running on the server that monitors the network connection. In another example, communication module 204 may submit the tool path descriptor as a record in a database maintained by the server. For example, the server may use a commercial database management system for storing shared part model data and for communicating with clients, thereby taking advantage of data integrity features associated with database management systems.

At step 306, one or more of the systems described herein may receive, from the server, shared model data corresponding to the tool path descriptor. For example, communication module 204 may, as part of client 102 in FIG. 2, receive, from server 106, shared model data 212 corresponding to tool path descriptor 210.

Communication module 204 may receive shared model data from the server in a variety of ways. For example, communication module 204 may monitor a network connection with the server to receive messages from the server containing tool path descriptors that have been applied to the shared part model maintained by the server. In another example, communication module 204 may use a database change notification or callback feature to receive notification that a tool path descriptor has been applied to the shared part model. Communication module 204 may then use remote database protocols to retrieve the applied changes.

At step 308, one or more of the systems described herein may apply the shared model data to the local part model. For example, application module 206 may, as part of client 102 in FIG. 2, apply shared model data 212 to local part model 110.

Application module 206 may apply the shared model data to the local part model in a variety of ways. For example, application module 206 may determine that shared model data 212 received from server 106 differs from tool path descriptor 210 transmitted to server 106, indicating that server 106 did not apply tool path descriptor 210 to shared part model 108 (for example, because a change made to the shared part model originating from another client prevented the tool path descriptor from being applied to the shared part model). In this example, application module 206 may apply shared model data 212 to local part model 110 by first reversing tool path request 208 on local part model 110, then inserting shared model data 212 into local part model 110.

Application module 206 may reverse the tool path request on the local part model in various ways. For example, application module 206 may save a portion of local part model 110 before performing tool path request 208 on local part model 110. In this example, application module 206 may reverse tool path request 208 by restoring the saved portion of local part model 110 before inserting shared model data 212 into local part model 110. In another example, application module 206 may indicate that tool path request 208 has not been committed to local part model 110 until shared model data 212 has been received from server 106. In this example, application module 206 may reverse tool path request 208 on local part model 110 by deleting uncommitted tool path request 208 from local part model 110 before inserting shared model data 212 into local part model 110.

In another example, application module 206 may determine that the shared model data is identical to the tool path descriptor. In this case, application module 206 may apply the shared model data to the local part model simply by permitting the tool path request previously applied to the local part model to remain in the local part model, rather than reversing the tool path request or inserting the shared model data into the local part model. In another example, if the shared model data is identical to the tool path descriptor, the server may send an indication to the client that no change to the local part model is required.

FIG. 4 is a functional block diagram depicting one embodiment of a system 400 for concurrent multi-user computer-aided manufacturing. As illustrated in this figure, system 400 may include one or more clients 102, each of which may have a local part model 110. System 400 may also include network 104 and server 106 with a shared part model 108 corresponding to the local part models 110, as well as one or more modules for performing one or more tasks. For example, and as will be described in greater detail below, exemplary system 400 may include a server communication module 402 that receives, from a client, a tool path descriptor 410 resulting from a tool path request on a local part model, for application to the shared part model 108. Exemplary system 400 may additionally include a queue management module 404 that queues, in a tool path descriptor queue 412, tool path descriptor 410. Queue management module 404 may also retrieve from tool path descriptor queue 412, tool path descriptor 410. Exemplary system 400 may additionally include a server application module 408 that applies tool path descriptor 410 to shared part model 108. Server communication module 402 may also submit the applied tool path descriptor 410 to the client for application to the local part model. Although illustrated as separate elements, one or more of the modules in FIG. 4 may represent portions of a single module or application.

Figure 5:
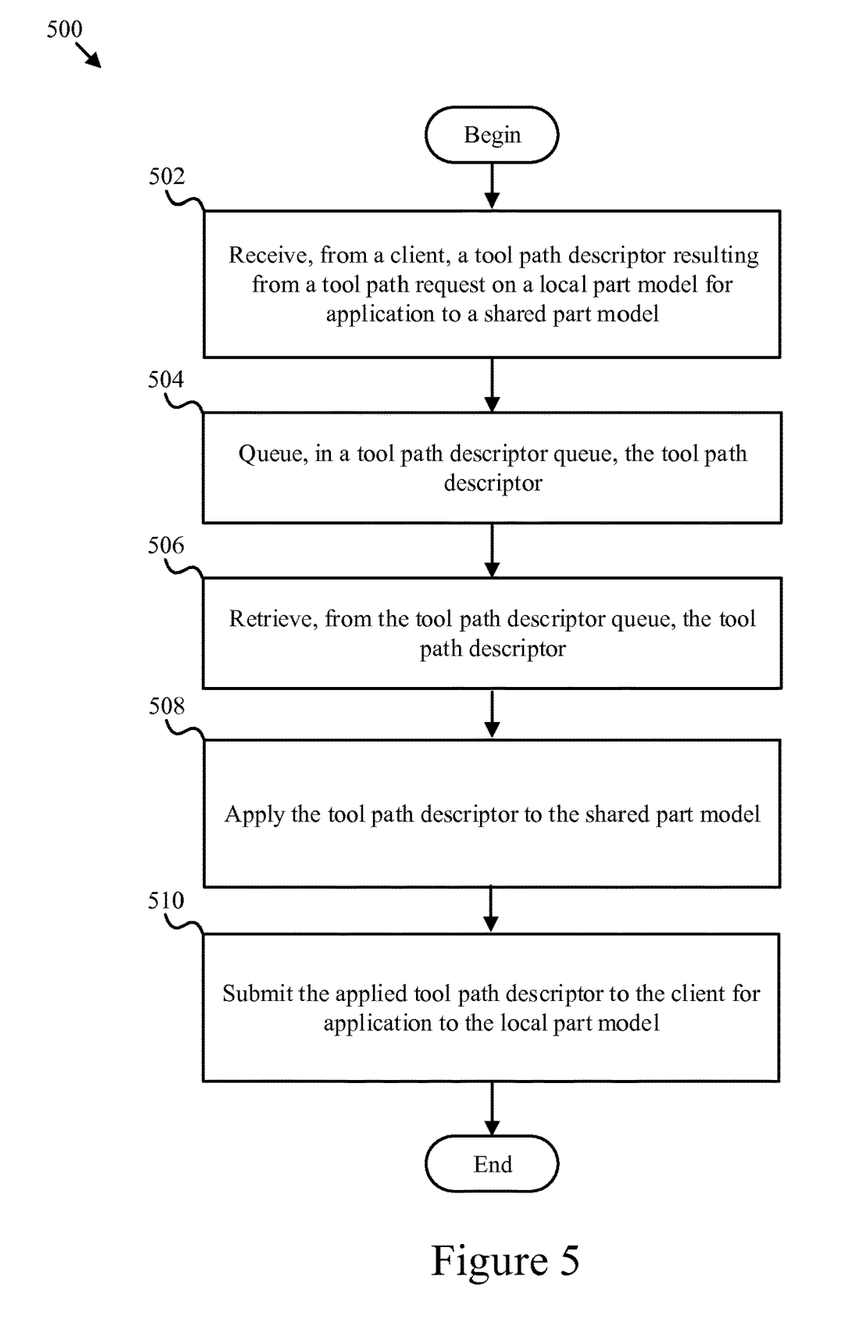
FIG. 5 is a flowchart diagram depicting one embodiment of a method for providing concurrent multi-user computer-aided manufacturing.

FIG. 5 is a flow diagram of an example computer-implemented method 500 for providing concurrent multi-user computer-aided manufacturing. The steps shown in FIG. 5 may be performed by any suitable computer-executable code and/or computing system. In some embodiments, the steps shown in FIG. 5 may be performed by server 106, one or more clients 102, or partitioned across server 106 and one or more clients 102.

As illustrated in FIG. 5, at step 502, one or more of the systems described herein may receive, from a client, a tool path descriptor resulting from a tool path request on a local part model for application to a shared part model. For example, server communication module 402 may, as part of server 106 in FIG. 4, receive, from client 102(A), tool path descriptor 410 resulting from a tool path request on local part model 110(A) for application to shared part model 108 on server 106.

Server communication module 402 may receive a tool path descriptor from a client in a variety of ways. For example, server communication module 402 may maintain a network connection to each client to facilitate two-way communication between the server and each client. In another example, server 106 may receive a tool path descriptor as a record entered into a database table maintained by server 106.

At step 504, one or more of the systems described herein may queue, in a tool path descriptor queue, the tool path descriptor. For example, queue management module 404 may, as part of server 106 in FIG. 4, queue, in tool path descriptor queue 412, tool path descriptor 410.

Queue management module 404 may queue the tool path descriptor in a tool path descriptor queue in a variety of ways. For example, queue management module 404 may maintain a message queue to which clients submit messages containing tool path descriptors. In another example, a database table may serve as the tool path descriptor queue. Clients may add records containing tool path descriptors to the database table.

At step 506, one or more of the systems described herein may retrieve from the tool path descriptor queue, the tool path descriptor. For example, queue management module 404 may, as part of server 106 in FIG. 4, retrieve from tool path descriptor queue 412, tool path descriptor 410.

Queue management module 404 may retrieve the tool path descriptor from the tool path descriptor queue in a variety of ways. For example, queue management module 404 may retrieve messages containing tool path descriptors from a message queue and apply them to the shared part model in the order they were received from the clients. As described above, a database table may serve as the tool path descriptor queue. Queue management module 404 may read records from the database table and apply them to the shared part model in the order the records were added to the database. After applying a tool path descriptor record to the shared part model, queue management module 404 may then modify a field in the tool path descriptor record indicating that the tool path descriptor contained in the database record has been applied to the shared part model.

At step 508, one or more of the systems described herein may apply the tool path descriptor to the shared part model.

For example, server application module 408 may, as part of server 106 in FIG. 4, apply tool path descriptor 410 to shared part model 108.

Server application module 408 may apply the tool path descriptor to the shared part model in any suitable manner. For example, server application module 408 may repeat one or more CAM system commands described in the tool path descriptor to the shared part model to synchronize the shared part model with the operation performed on the local part model at the client. In another example, the tool path descriptor may contain the portion of the local part model data modified by the user's tool path request. In this example, applying the tool path descriptor to the shared part model may include modifying the shared part model database with the data contained in the tool path descriptor.

At step 510, one or more of the systems described herein may submit the applied tool path descriptor to the client for application to the local part model. For example, server communication module 402 may, as part of server 106 in FIG. 4, submit the applied tool path descriptor 410 to client 102(A) for application to local part model 110(A) maintained by client 102(A).

Server communication module 402 may submit the applied tool path descriptor to the client for application to the local part model in any suitable manner. For example, server communication module 402 may transmit the applied tool path descriptor to the client via a network connection to the client. In another example, server communication module 402 may notify the client using a callback routine or database change notification that the tool path descriptor is available in a database table for retrieval by the client.

In some examples, systems and methods described herein may submit the applied tool path descriptor to one or more additional clients for application to an additional local part model maintained by the additional client. For example, as shown in FIG. 4, server application module 408 may apply tool path descriptor 410, received from client 102(A), to shared part model 108. Server communication module 402 may then submit tool path descriptor 410 to client 102(B) for application to local part model 110(B) maintained by client 102(B).

In some examples, applying the tool path descriptor to the shared part model may include determining that the tool path request indicated by the tool path descriptor cannot be performed on the shared part model. For example, an operation performed by another client may be applied to the shared part model that prevents another tool path request from being performed on the shared part model. In this example, submitting the applied tool path descriptor to the client may include indicating to the client that the tool path request indicated by the tool path descriptor cannot be performed on the shared part model. As described above, the client may then reverse the tool path request on the local part model.

As described above, systems and methods described herein may facilitate multi-user computer-assisted manufacturing of a shared part model by submitting changes made by users on separate clients to a server that reconciles the changes with a shared part model. The server may then propagate the changes to the shared part model back to each of the clients, for application to local copies of the part model. In this way, systems and methods described herein may maintain the integrity and coherence of the part model while multiple users concurrently perform tool path planning operations on the shared model, which may permit faster tool path planning for the part model than is possible with single-user systems. The collaborative process planning environment created by systems and methods described herein may also accelerate process planning time by allowing each CAM system user to apply their experience and expertise to the portion of the process plan with which they are most familiar. Collaborative process planning may likewise facilitate CAM system user training.

It should also be understood that this description is not intended to limit the invention. On the contrary, the example embodiments are intended to cover alternatives, modifications, and equivalents, which are included in the spirit and scope of the invention as defined by the appended claims. Further, in the detailed description of the example embodiments, numerous specific details are set forth in order to provide a comprehensive understanding of the claimed invention. However, one skilled in the art would understand that various embodiments may be practiced without such specific details.

Although the features and elements of the present example embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for concurrent multi-user computer-aided manufacturing, executed by at least one processor, the method comprising:
   receiving a tool path descriptor resulting from a tool path request on a local copy of a part model, wherein the tool path descriptor corresponds to a change made to the local part model;
   subsequent to receiving the tool path descriptor, submitting the tool path descriptor to a tool path descriptor queue for application to a shared copy of the part model stored on a server;
   receiving, from the server subsequent to submitting the tool path descriptor, shared model data corresponding to the tool path descriptor;
   subsequent to receiving the shared model data, applying the received shared model data to the local part model;
   manufacturing a part according to the received shared model data or the local part model; and
   wherein the shared model data differs from the tool path descriptor and applying the shared model data to the local part model comprises:
      deleting the uncommitted tool path request from the local part model,
      inserting the shared model data into the local part model, and
      indicating that the tool path request has not been committed to the local part model until the shared model data has been received from the server.

2. A method for concurrent multi-user computer-aided manufacturing, executed by at least one processor, the method comprising:
   receiving, from a client, a tool path descriptor resulting from a tool path request on a local part model for application to a shared part model, wherein the tool path descriptor corresponds to a change made to the local part model;

subsequent to receiving the tool path descriptor, queuing, in a tool path descriptor queue, the tool path descriptor;

subsequent to queuing the tool path descriptor, retrieving from the tool path descriptor queue, the tool path descriptor;

subsequent to retrieving the tool path descriptor, applying the tool path descriptor to the shared part model;

subsequent to retrieving the tool path descriptor, submitting the applied tool path descriptor to the client for application to the local part model;

subsequent to applying the tool path descriptor, manufacturing a part according to the shared model data or the local part model; and wherein the shared model data differs from the tool path descriptor and applying the shared model data to the local part model comprises:

deleting the uncommitted tool path request from the local part model, inserting the shared model data into the local part model, and indicating that the tool path request has not been committed to the local part model until the shared model data has been received from the server.

3. The method of claim 2, further comprising submitting the applied tool path descriptor to at least one additional client for application to an additional local part model maintained by the additional client.

4. The method of claim 2, wherein a processor of the at least one processor is disposed in a computer and at least one operation of the receiving, queuing, retrieving, applying and submitting operations is into one or more non-application software layers of the computer.

5. A system for concurrent multi-user computer-aided manufacturing, the system comprising:

a tool path module, stored in memory, that receives a tool path descriptor resulting from a tool path request on a local copy of a part model;

a communication module, stored in memory, that:

submits the received tool path descriptor to a tool path descriptor queue for application to a shared copy of the part model stored on a server; wherein the tool path descriptor corresponds to a change made to the local part model; and receives, from the server, shared model data corresponding to the submitted tool path descriptor;

an application module, stored in memory, that:

applies the received shared model data to the local part model;

at least one physical processor configured to execute the tool path descriptor in conjunction with manufacturing a part;

the least one physical processor configured to execute the tool path module, the communication module, and the application module; and wherein the shared model data differs from the tool path descriptor and applying the shared model data to the local part model comprises:

deleting the uncommitted tool path request from the local part model, inserting the shared model data into the local part model, and indicating that the tool path request has not been committed to the local part model until the shared model data has been received from the server.

6. A system for concurrent multi-user computer-aided manufacturing, the system comprising:

a server communication module, stored in memory, that receives, from a client, a tool path descriptor resulting from a tool path request on a local part model for application to a shared part model;

a queue management module, stored in memory, that:

queues, in a tool path descriptor queue, the received tool path descriptor; and retrieves from the tool path descriptor queue, the queued tool path descriptor;

a server application module, stored in memory, that:

applies the retrieved tool path descriptor to the shared part model, wherein the tool path descriptor corresponds to a change made to the local part model;

wherein the server communication module also submits the applied tool path descriptor to the client for application to the local part model;

at least one physical processor configured to execute the applied tool path descriptor in conjunction with manufacturing a part;

the least one physical processor configured to execute the server communication module, the queue management module, and the server application module; and wherein the shared model data differs from the tool path descriptor and applying the shared model data to the local part model comprises:

deleting the uncommitted tool path request from the local part model, inserting the shared model data into the local part model, and indicating that the tool path request has not been committed to the local part model until the shared model data has been received from the server.

7. The system of claim 6, wherein the server communication module submits the applied tool path descriptor to at least one additional client for application to an additional local part model maintained by the additional client.

* * * * *